United States Patent [19]

Simpson

[11] Patent Number: 5,733,945
[45] Date of Patent: Mar. 31, 1998

[54] PROCESS FOR MANUFACTURING POLYURETHANE USING A METAL ACETYL ACETONATE/ACETYL ACETONE CATALYST SYSTEM AND THE PRODUCT MADE THEREFROM

[75] Inventor: Scott S. Simpson, Woodstock, Conn.

[73] Assignee: Rogers Corporation, Rogers, Conn.

[21] Appl. No.: 566,480

[22] Filed: Dec. 4, 1995

Related U.S. Application Data

[63] Continuation of Ser. No. 504,855, Jul. 20, 1995.

[51] Int. Cl.$^6$ .................. C08G 18/16; C08G 18/22
[52] U.S. Cl. .................. 521/124; 521/125; 521/130; 528/55; 528/56; 528/57
[58] Field of Search .................. 521/124, 125, 521/130; 528/55, 56, 57

[56] References Cited

U.S. PATENT DOCUMENTS

| | | |
|---|---|---|
| 2,846,416 | 8/1958 | Arnold et al. |
| 2,916,464 | 12/1959 | Ebneth et al. |
| 2,933,462 | 4/1960 | Fischer. |
| 3,291,660 | 12/1966 | Oberth et al. |
| 3,450,648 | 6/1969 | Windemuth et al. |
| 3,580,938 | 5/1971 | Kroll. |
| 3,634,329 | 1/1972 | Chujo et al. |
| 3,635,906 | 1/1972 | Jayawant. |
| 3,772,224 | 11/1973 | Marlin et al. |
| 3,947,386 | 3/1976 | Prokai et al. |
| 4,050,969 | 9/1977 | Oberth. |
| 4,138,114 | 2/1979 | Andersen. |
| 4,151,345 | 4/1979 | Hillegass. |
| 4,263,423 | 4/1981 | Schwindt et al. |
| 4,598,136 | 7/1986 | Wick. |
| 4,788,170 | 11/1988 | Wengrovius. |
| 4,886,838 | 12/1989 | Dewhurst ............... 521/124 |
| 4,886,839 | 12/1989 | Dallavia, Jr. et al. ........ 521/124 |

OTHER PUBLICATIONS

A.E. Oberth et al. Metal Catalysis in Aliphatic Isocyanate–Alcohol Reactions; pp. 383–388—reaction kinetics of metal AA systems, Aug. 1969.

A.E. Obert et al. Polyurethane–Based Propellants; pp. 84–121—use of FeAA system in unrelated field, rocket propellants, Nov. 1968.

Arnold, C., Development and Characterization of EN-7: A Ferric Acethylacetonate Catalyzed Polybutadiene–Based Elastomer; pp. 238–245/Oct. 1974—unrelated field, rocket propellants.

Foster, P. "A Study of Ferric Acetylacetonate and Other Catalysts in the Curing Agent for Adiprene" L-315; PGS. A-1-A-10/ Dec. 1973—use of FeAA system in field of rocket propellants.

Ihms, O. et al., "Effect of Catalysts on the Kinetics of the Water–Toluene Diisocyanate Reactions". pp. 61–65/Mar. 1955—use of FeAA only in polyurethane foams.

Gafuroa, M.P. et al. "Mechanism of Catalysis by Ferric Acetylacetonate of the Reaction Between Isocyanates and Hydroxybuatdiene Oligomers", pp. 1945–1951/1986—reaction of kinetics of FeAA systems.

*Primary Examiner*—Morton Foelak
*Attorney, Agent, or Firm*—Fishman, Dionne Cantor & Colburn

[57] ABSTRACT

Nickel acetyl acetonate catalysts used in the manufacture of polyurethanes and particularly polyurathane foam, is replaced with a more environmentally friendly organo-metallic catalyst, specifically other metal acetyl acetonates such as iron or copper. In accordance with an important feature of this invention, in addition to the metal acetyl acetonate, the catalyst system also includes acetyl acetone. The acetyl acetone acts as a delay mechanism to delay the catalytic action of the metal acetyl acetonate which is normally highly catalytic at relatively low temperatures. It will be appreciated that high catalytic activity at relatively low temperature will lead to deleterious premature cure. By adding acetyl acetone into the catalyst system, the acetyl acetone acts to delay and/or slow the catalytic action of the metal acetyl acetonate until the polyurethane is heated at which point the acetyl acetone is driven off and the metal acetyl acetonate then provides a relatively fast cure at the elevated temperature.

12 Claims, 5 Drawing Sheets

5,733,945

PROCESS FOR MANUFACTURING POLYURETHANE USING A METAL ACETYL ACETONATE/ACETYL ACETONE CATALYST SYSTEM AND THE PRODUCT MADE THEREFROM

This application is a continuation of copending application Ser. No. 08/504,855 filed on Jul. 20, 1995.

BACKGROUND OF THE INVENTION

1. Field of the Invention

This invention relates generally to a method for producing polyurethane and the product produced therefrom. More particularly, this invention relates to a method for manufacturing polyurethanes which employ a new and improved catalyst system comprising a metal acetyl acetonate and acetyl acetone. This method is particularly useful in the manufacture of polyurethane foams and especially useful for making polyurethane foams using a frothing technique.

2. The Prior Art

While the process of the present invention finds utility generally in the manufacture of polyurethanes, the present invention is particularly useful in foamed polyurethanes and more particularly, those foamed polyurethanes made using a frothing technique. Therefore, reference will be made to prior art frothing techniques although it should be understood that such reference is by example only and for ease of illustration.

Conventional processes related to frothed polyurethanes involve the manufacture of a heat curable polyurethane forming froth which is substantially structurally and chemically stable but workable at ambient conditions, (i.e., capable of being transported for considerable distances and/or temporarily stored and then shaped and formed) and which can still be rapidly cured to a tack-free condition when desired by the application of heat, as by raising the temperature of the froth. The froths preferably contain, as the substantially nonaqueous liquid phase, stable polyurethane forming components, i.e., components such as polyisocyanate and an active hydrogen compound, that are substantially reactive with each other typically in the presence of catalysts, if contained therein, only at a temperature of at least about 70° C. or higher (or at ambient temperatures in the presence of a fast cure promoting catalyst) and an organic polysiloxane surfactant for stabilizing the structure of the froth until it is cured as by heating. The gas or bubble phase of the novel froths can be any inert gas, such as air, uniformly dispersed throughout the liquid phase in the form of tiny bubbles or cells.

The froth is generally produced by mechanically beating air into the appropriate foaming media and is subsequently cured (by the application of heat, or at ambient temperature by a fast-cure promoting catalyst) to resulting polyurethane foams having uniform cell structures and low densities. The aforementioned polyurethane compositions can contain a catalyst and/or a cross-linking agent, preferably, so long as its presence will not initiate substantial polymerization prematurely. Other additives for providing special effects, e.g., coloring agents, fillers, etc., can also be included, preferably, so long as they do not initiate substantial polymerization at ambient temperatures or interfere with froth stability.

Suitable catalysts include nickel acetylacetonate, more formally known as bis(2,4-pentanedionate) nickel (II), (diacetonitrilediacetylacetonato nickel) and derivatives thereof, such as diacetonitrilediacetylacetonato nickel, dibensonihilediacetylacetonato nickel, bis(triphenylphosphine)-diacetylacetonato nickel and the like. In addition, tin catalysts such a dibutyltin diaurate can be used advantageously.

Conventional metal catalysts in conventional concentrations also can be used. If desired, the conventional metal catalysts are used in lower than usual concentrations to avoid premature curing. Such catalysts include both inorganic metal compounds and metal compounds which contain organic groups. Particularly useful catalysts are organotin compounds. These catalysts can be used either alone or in mixtures with one or more of the others. Among the organo-tin compounds are stannous acylates, such as alkyl tin salts of carboxylic acids, e.g., dibutyltin dilaurate. Other metal salts such as lead octoate and the like can also be employed.

While a number of catalysts (as evidenced by the foregoing discussion) are useful in curing the polyurethane foam, typically nickel acetyl acetonate (NAA), has been used for frothing. NAA has been a preferred catalyst in part because it has a relatively low catalytic activity at low tempertures (when the polyurethane components are being mixed or otherwise processed) and the catalytic activity markedly increases at increasing temperatures at which point a full cure is desirable. However, NAA suffers from several important deficiencies and drawbacks. One important drawback is the adverse environmental properties associated with NAA, particularly related to the costly and problematic disposal of spent NAA catalyst.

Other organometallic compounds and more specifically other metal acetyl acetonates including iron, chromium and lead have been suggested for use as a catalyst in polyurethane manufacture. Iron acetylacetonate (FeAA) is a particularly promising catalyst due to its more favorable environmental disposal consequences and FeAA has been suggested for use as a catalyst as described in, for example, U.S. Pat. Nos. 4,263,423; 4,598,136; M. P. Gafurova et at, "Mechanism of Catalysis by Ferric Acetylacetonate of the Reaction Between Isocyanates and Hydroxbutadiene Oligomers" Polymer Science U.S.S.R., Vol. 28, No. 8, pp. 1945–1951, 1986; and David Ihms et al. "Effect of Catalysts on the Kinetics of the Water-Toluene Diisocyanate Reaction" Journal of Coatings Technology, vol. 57, No. 722, March, 1985.

However, while promising improved environmental results, FeAA also suffers from drawbacks in its catalytic action, particularly with frothed urethanes. These drawbacks include the fact that FeAA is highly active at low temperatures. As a result, the FeAA catalyst cures a urethane composition prior to the components of such composition being properly mixed or otherwise processed. This premature cure results in a final product which exhibits poor physical properties.

SUMMARY OF THE INVENTION

The above-discussed and other problems and deficiencies of the prior art are overcome or alleviated by the process for manufacturing polyurethane of the present invention. In accordance with the present invention, nickel acetyl acetonate catalysts used in the manufacture of polyurethanes and particularly polyurethane foam, is replaced with a more environmentally friendly organo-metallic catalyst, specifically metal acetyl acetonates such as those selected from the group of ferric, ferrous, cupric and zinc. The preferred embodiment of this invention utilizes iron acetyl acetonate due to its relative stability, good catalytic activity and lack of toxicity.

In accordance with an important feature of this invention, in addition to the metal acetyl acetonate, the catalyst system also includes acetyl acetone. The acetyl acetone acts as a delay mechanism to delay the catalytic action of the metal acetyl acetonate which is normally highly catalytic at relatively low temperatures (e.g., room temperature). It will be appreciated that high catalytic activity at relatively low temperature will lead to premature cure. The boiling point of acetyl acetone is 139° C. By adding acetyl acetone into the catalyst system, the acetyl acetone acts to delay and/or slow the catalytic action of the metal acetyl acetonate until the polyurethane is heated such that the acetyl acetone is substantially driven off and a now desirable, relatively fast cure at an elevated temperature then takes place.

While the preferred embodiment of this invention utilizes environmentally desirable metal acetyl acetonates such as iron and copper, the novel process wherein acetyl acetone is used as a catalytic inhibitor can also be quite useful when conventional nickel and other less environmentally friendly metals such as lead are used. Thus, the process of the present invention wherein the catalytic system comprises a combination of metal acetyl acetonate and acetyl acetone (as an inhibitor) and wherein the acetyl acetone is driven off with rising temperature to permit a final, complete cure late in the processing cycle is useful and applies to any metal acetyl acetonate including nickel.

The catalytic system comprised of certain metal acetyl acetonates and acetyl acetone provides many features and advantages including, in certain cases, quite favorable environmental properties (e.g., ease of disposal). In addition, this system provides delay to the normally low temperature, fast cure rates of metal acetyl acetonates. This delay allows sufficient time for mixing and spreading, casting or mold filling without premature curing.

The above-discussed and other features and advantages of the present invention will be appreciated and understood by the following description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
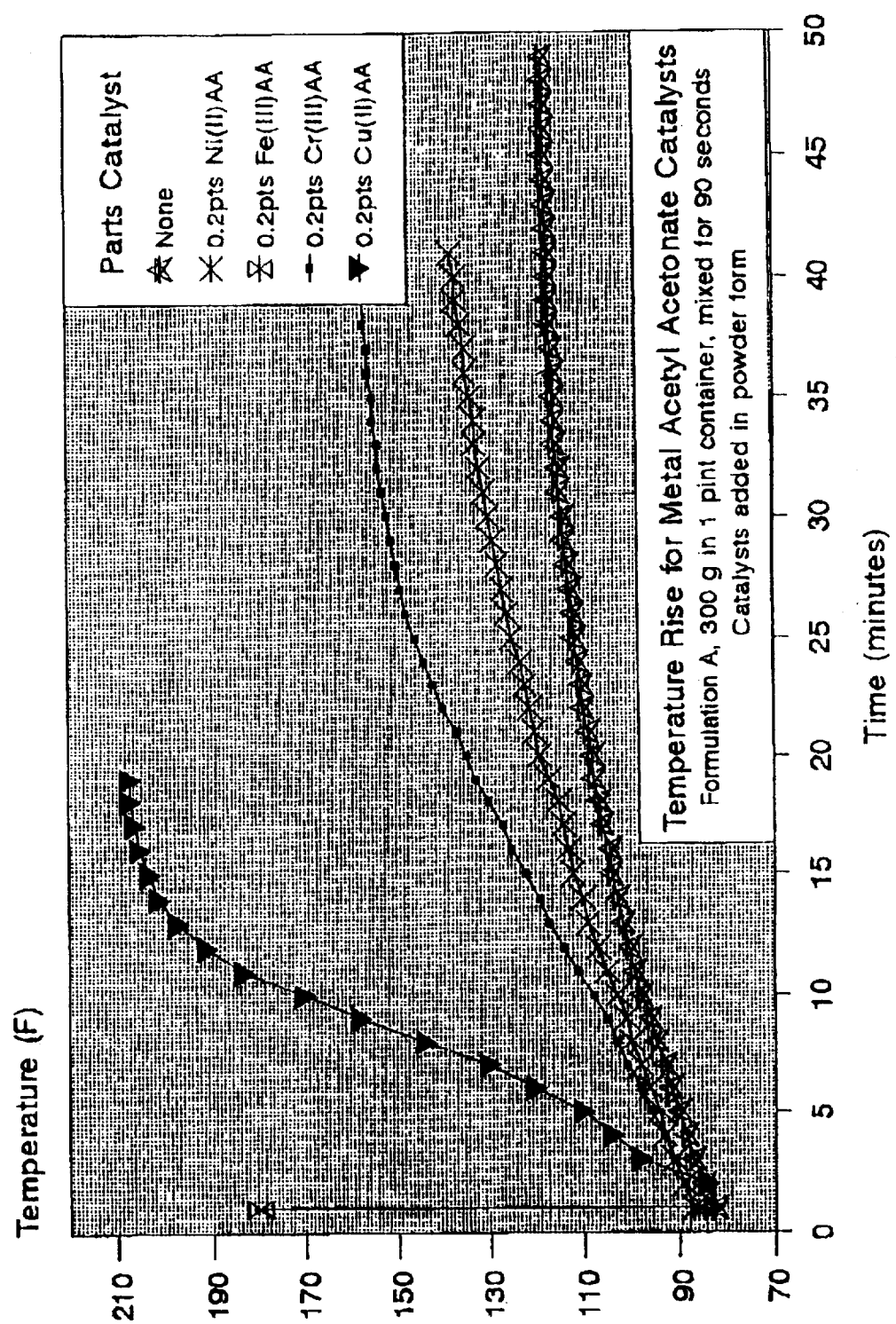
FIG. 1 is a graph of temperature rise vs. time for a reacting urethane mixture using several different metal acetyl acetonate catalysts.

As pointed out above, throughout this disclosure reference will be made to mechanically frothed urethane foam or mechanically frothed urethane forming mixtures. However, it will be understood that chemically frothed urethane foams and non-foamed polyurethane can benefit from and be used in practicing the process of the present invention.

Any mechanically frothed polyurethane forming mixture may be used in the practice of the process and forming of the products of the present invention. Reference is particularly made to U.S. Pat. Nos. 3,706,681; 3,755,212; 3,772,224; 3,821,130; 3,862,879; 3,947,386; 4,022,722, 4,216,177 and 4,692,476 for disclosures of mechanically frothed polyurethane forming mixtures and components (e.g., surfactant) which are particularly suitable for use in the present invention, which United States patents are incorporated herein by reference for inclusion of their disclosures herein. It will also be understood that any other mechanically frothed polyurethane forming mixture may be employed in the present invention.

As discussed in detail in commonly assigned U.S. Pat. No. 4,216,177, the mechanically frothed polyurethane forming mixture which will hereinafter be generally referred to as the foam mixture or the urethane forming mixture, is formed by mechanically beating an inert gas, such as air, into the mixture in standard mixing equipment such as an SKG mixer, Hobart mixer or an Oakes mixer. The mixture is thus mechanically frothed, to form a froth which is substantially chemically stable and is structurally stable but easily workable at ambient temperatures between 15° C. and 30° C. The consistency of this froth closely resembles that of aerosol dispensed shaving cream.

The foam mixture is then transferred at a controlled rate through a hose or other conduit to be deposited onto a moving release support. The release support will usually be a release paper which may either have a plain surface or a textured surface onto which the foam mixture is deposited. The release paper is played out from a supply roll and is pulled by rolls to pass by various stations in the system, and, generally, is ultimately rewound on a take-up roll. In addition to being paper, the support material may be a thin sheet of metal such as stainless steel or be made from composite materials; it may have a release coating or be coated with a material such as a urethane film which transfers to the surface of the foam. If desired, the support material may be a substrate of fibrous or other material which becomes laminated to and forms part of the final product instead of being separated from the foam and being rewound on a take-up roll. Alternately, the release support could also be a conveyor belt.

As the release paper is moved with the foam material deposited thereon, the foam is spread to a layer of desired thickness by a doctoring blade or other suitable spreading deuce. A simple knife over table doctoring blade or other more complex spreading devices such as a knife over roller coaters or three or four roll reversible coaters may be employed. The doctoring blade spreads the foam material to the desired thickness which will typically be in the range of from 0.01 to 0.50 inches.

The assembly of the release support and the gauged layer of foam is then delivered to a heating zone which consists of spaced apart lower and upper heating platens. The platens may be parallel and have an equi-distant spacing therebetween along their entire lengths, or they may be slightly diverging from the entrance to the exit. The heating platens are heated by electric heating elements which may be separately controlled to provide incremental heating. The platens may be simple platens or each may be made up of two or more separate platens, any of which may have separate electrical heating elements to provide zones of different temperatures.

As the assembly of release paper and the gauged layer of frothed material passes through the heat zone between the platens, there is direct conduction heating of the froth layer from the lower platen which is in direct contact with release paper. In addition, the upper heating platen may be spaced as close as desired above the upper surface of the froth layer as long as it does not contact the uncovered upper layer of the material and thus provides a substantially amount of radiant heating as well as some convection heating to the froth sheet. During this heating step, the froth material is cured in a known fashion by the promotion of polymerization whereby a cured polyurethane foam is produced. The temperatures of the platens are maintained in a range from about 200° F. to about 450° F. depending on the composition of the foam material. These platens may be maintained at equal or unequal temperatures depending on the particular nature of the curing process desired to be effected. For example, differential temperatures can be established for purposes of forming an integral skin on one layer of the foam or for laminating a relatively heavy layer to the foam.

After the assembly is heated, it is then passed to a cooling zone where it is cooled by any suitable cooling device such as fans. The final step of the process involves the removal of the release paper and taking it up on a roll. The removal of the release paper leaves as a final product the cured polyurethane foam. This final product is then taken up on a roll for storage and use as desired. The polyurethane foam product produced by the process described will be a foam sheet of uniform gauge. The gauge is easily controlled by the doctoring blade since there is no reactive expansion of foaming material during the curing process. The only expansion during the curing process is heat induced expansion of the air bubbles in the foam mixture, the total amount of which can be easily calculated in advance to provide close control on the gauge of the finished product. The density of the finished product is also relatively uniform because the conduction and radiant heating during the curing process provides for relatively even heat distribution across the foam sheet, at least for sheets up to 0.50 inches thick.

The urethane mixture is, of course, comprised of any number of polyol and isocyanate monomers, surfactants and other components, all of which are described in detail in the aforementioned patents. Preferably, the isocyanate comprises 4,4' diphenylmethane diisocyanate (MDI), MDI adducts and mixtures thereof.

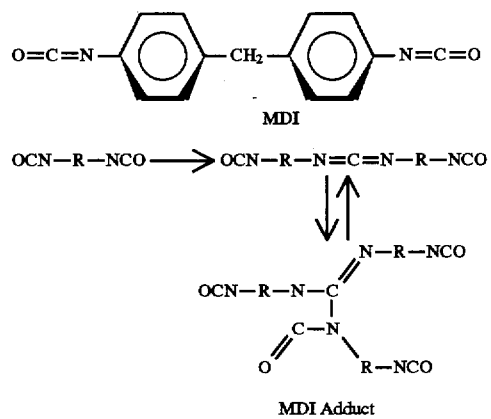

MDI Adduct

A preferred isocyanate is a mixture of MDI and MDI adduct sold commercially by Dow- as Isonate 143L. This isocyanate breaks down with heat thereby liberating additional isocyanate late in the reaction (in the high temperature curing zones).

An important feature of this invention is the catalyst system comprised of a metal acetyl acetonate.

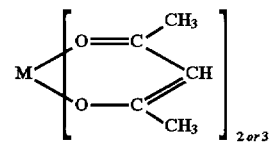

where M=aluminum, barium, cadmium, calcium, cerium (III), chromium (III), cobalt (II), cobalt (III), copper (II), indium, iron (III), lanthanum, lead (II), manganese (II), manganese (III), neodymium, nickel (II), palladium (II), potassium, samarium, sodium, terbium, titanium, vanadium, yttrium, zinc and zirconium. The metal acetyl acetonate is most conveniently added by predissolution in a suitable solvent such as dipropylene glycol or other hydroxyl containing compound which will then participate in the reaction and become part of the final product.

Added to the metal acetyl acetonate is acetyl acetone (2,4-pentanedione):

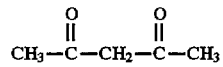

In general, the ratio of metal acetyl acetonate to acetyl acetone is about 2:1 on a weight basis. It has been discovered that the acetyl acetone can be used to delay or inhibit the normally reactive metal acetyl acetonate at the lower temperatures needed to achieve proper mixing and casting. In other words, the acetyl acetone provides heat latency which allows time for the required mixing, casting and other procedures, and avoids deleterious premature curing during low temperature processing. However, as the material is cured in the several heating zones and the temperature of the urethane mixture rises, the acetyl acetone is driven off. With the acetyl acetone removed together with its associated delaying function, the metal acetyl acetonate is allowed to resume its normally high reactivity and provide a very high level of catalysis at the end of the polyurethane reaction. This high reactivity late in the processing cycle is advantageous and provides improved physical properties such as compression set. The late curing is particularly advantageous when using the aforementioned MDI adduct since additional isocyanate is generated late in the reaction due to adduct breakdown. For example, a mechanism for urethane catalysis using a catalytic system of iron acetyl acetonate and acetyl acetone is as follows:

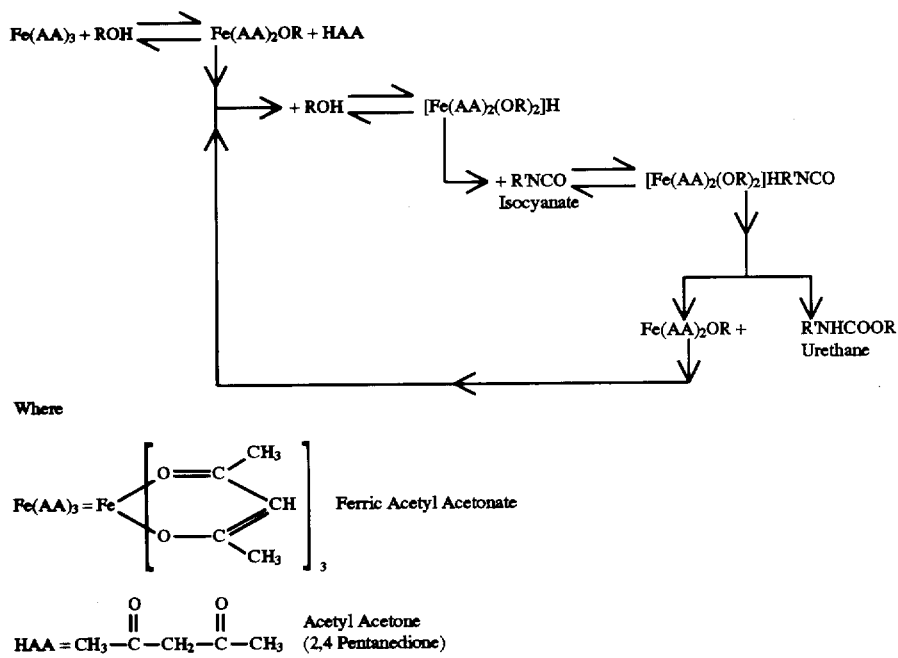

Figure 2:
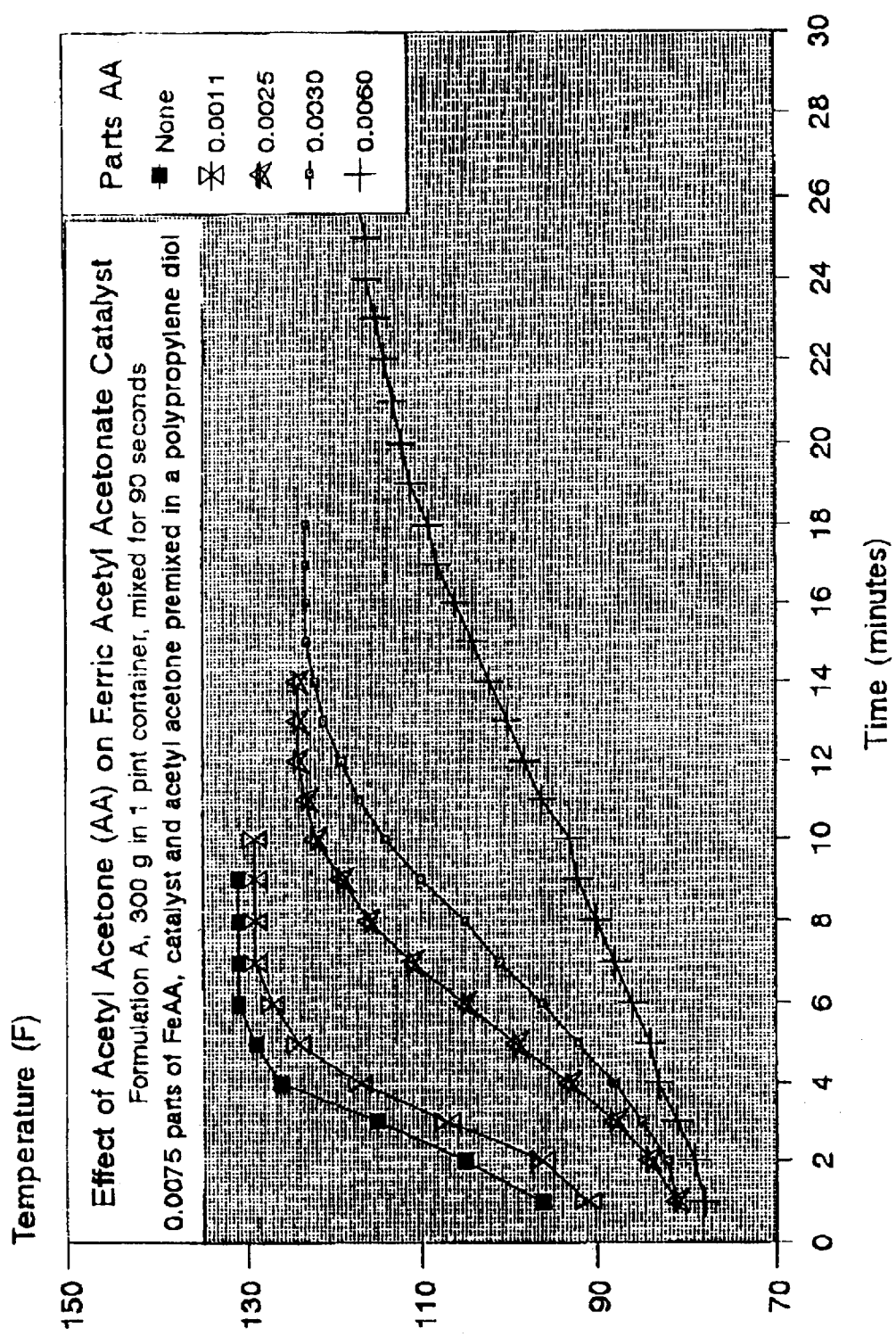
FIG. 2 is a graph of temperature rise vs. time for a reacting urethane mixture with ferric acetyl acetonate catalyst including catalyst systems of ferric acetyl acetonate and acetyl acetone.
Figure 3:
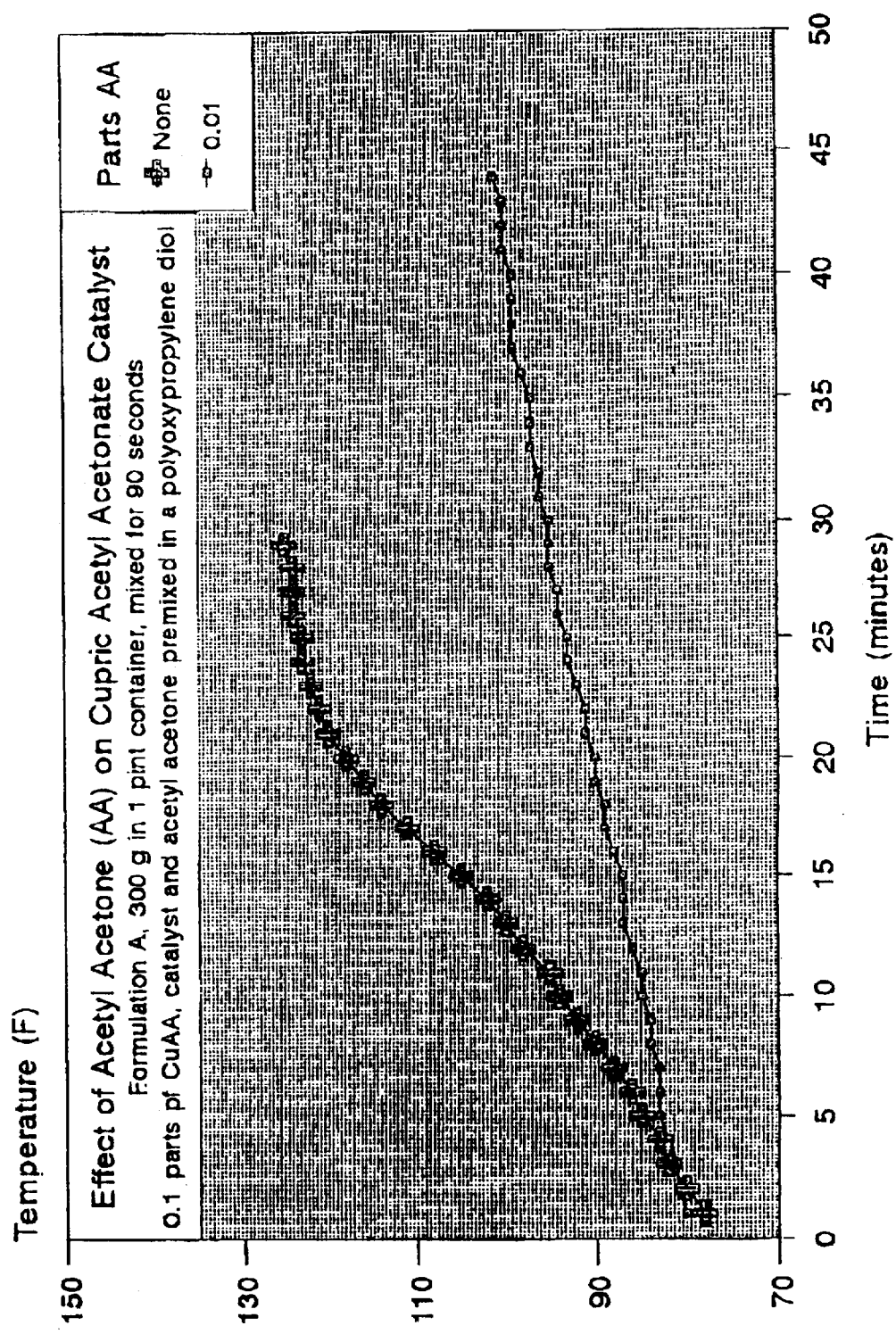
FIG. 3 is a graph of temperature rise vs. time for a reacting urethane mixture with copper acetyl acetonate catalyst including systems of copper acetyl acetonate and acetyl acetone.

The foregoing description of the catalytic system of this invention, that is, the combination of at least one metal acetyl acetonate and acetyl acetone for use in a process for manufacturing polyurethane is clearly demonstrated with reference to FIGS. 1–3. FIG. 1 is a graph of time vs. temperature rise for a reacting urethane mixture using a variety of metal acetyl acetonates without the addition of acetyl acetone. FIG. 1 shows the high catalytic activity with respect to time of the metal acetyl acetonates. This is particularly true for ferric and cupric acetyl acetonates. Indeed, the catalytic activity is so high for these two materials that it has been understood that neither ferric nor cupric acetyl acetonate could be used to manufacture frothed polyurethane foam due to premature curing and the problems associated therewith.

In FIG. 2, the ferrous acetyl acetonate has been combined with acetyl acetone. As a result, the catalytic activity of the catalyst with respect to time at low temperatures is significantly slowed.

FIG. 3 depicts similar results for a catalytic system composed of cupric acetyl acetonate and acetyl acetone; that is, FIG. 3 shows that acetyl acetone also delays the activity of the cuprous acetyl acetonate.

EXAMPLES

All raw materials (Formulation A listed below) except the isocyanate and catalyst solution were mixed and placed in a holding tank with agitation and under dry nitrogen. This mixture was then pumped at a controlled flow rate to a high shear mixing head of the Oakes types. The isocyanate and catalyst mixture were also separately pumped into the mixing head at controlled flow rates and at the proper flow ratios relative to the polyols mixture flow rate. Flow meters were used to measure and adjust the flow rates of the various raw material streams. Dry air was also introduced into the mix head. A Matheson gas flow rate controller was used to adjust the air flow rate such that cured material of about 20 lbs/ft³ density was produced. After mixing and foaming was accomplished in the high shear mixer the material was pumped through a flexible hose and our through a rigid nozzle. The foam was then cast onto coated release paper which had been dried by passing it through a high air flow oven at 275° to 300° F. just prior to the point where the foam was introduced. This prevented any water which might have been in the paper from participating in the reaction. The release paper was 13" wide and was drawn through the machine at a controlled speed, in this case at seven feet per minute (FPM). The paper and cast foam then passed under a knife over roll (KOR) coater. The KOR spread the foam and was used to control the thickness of the final product to about 135 mils. The cast width of the foam product is about 8". The coated release paper then passed through a curing section which consists of heated bottom platens of the following lengths; 90", 24", 24", 24", 36", 36". These bottom platens were kept at the following temperatures by a series of thermocouples, controllers and heating elements; 200°, 200°, 200°, 325°, 350°, 375° F. A series of upper platens, at a gap of about 6" from the bottom platens for the unheated (RT) upper platens and a gap of 1" for the heated upper platens, were controlled to the following temperatures; RT, RT, RT, 450°, 450°, 450° F. The cured product then passed through an air cooling section, a series of drive rollers and was wound up on a take-up roll.

Details of the urethane formulation and the catalyst and acetyl acetone levels used are as follows:

TABLE 1

| Formulation A | | | |
|---|---|---|---|
| Material | Company | Description | Parts |
| Polymer Polyol | Arco 34-45 | About 300 molecular weight polyoxypropylene triol with polystyrene and polyacrylonitrile grafted onto the polyoxypropylene chain. Acrylonitrile content is | 56 |

TABLE 1-continued

Formulation A

| Material | Company | Description | Parts |
|---|---|---|---|
| | | 9.9% by weight, styrene content is 8.1% by weight. Thus, total molecular weight is about 3740 | |
| Polyesterpolyol | Union Carbide 0200 | A 530 molecular weight caprolactone base polyester diol | 11 |
| Dipropyleneglycol | — | About 134 molecular weight secondary ether diol. | 9 |
| Surfactant | OSI Specialties, Inc. L5614 | A high molecular weight block copolymer of polydimethylsiloxane and polyoxyalkylene. Diluted at about 50 weight percent with a linear alkylbenzene | 3 |
| Alumina trihydrate filler | — | — | 21 |
| MDI adduct | Dow Isonate 143L | A mixture of MDI (diphenyl methane diisocyanate) and a trifunctional cycloadduct produced by introducing carbodiimide linkages in MDI. | 30 |

TABLE 2

Catalyst and Acetyl Acetone Levels versus Compression Set (CS) and Heat of Reaction Observations

| Run # | ppm FeAA[1] | ppm AA[1] | % CS[2] | AC % CS[2] | Observations |
|---|---|---|---|---|---|
| 1 | 19 | 0 | 38.3 | 13.7 | Nozzle hot, run aborted after 10', cure behind KOR |
| | 19 | 4.8 | 37.6 | 15.7 | Nozzle hot, run aborted after 40', cure behind KOR |
| 2 | 19 | 6.7 | 40.3 | 15.0 | Nozzle warm, but cure okay |
| | 29 | 10.1 | 26.0 | 11.3 | Nozzle warm, but cure okay |
| | 38 | 13.5 | 26.2 | 5.7 | Nozzle warm, but cure okay |
| | 48 | 16.8 | 12.3 | 3.8 | Nozzle warm, but cure okay |
| | 58 | 20.2 | 20.8 | 3.1 | Nozzle ware, but cure okay |
| | 77 | 26.9 | 8.0 | 4.7 | Nozzle warm, some swirling |
| 3 | 38 | 30.7 | 18.1 | 5.8 | Nozzle cold |
| | 77 | 61.5 | 11.8 | 6.3 | Nozzle cold |
| | 115 | 92.3 | 10.2 | 3.7 | Nozzle cold |

[1]FeAA & AA added by injection into mixhead as a solution in a polyetherpolyol: FeAA @ 0.25 wt %, AA @ various concentrations
[2]% CS = % of original thickness retained after 50% compression for 22 hrs @ 70° C. AC % CS = same measurement after sample has been steam autoclaved for 5 hours at 250° F.

While the preferred embodiment of this invention utilizes environmentally desirable metal acetyl acetonates such as iron and copper, the novel process wherein acetyl acetone is used as a catalytic inhibitor can also be quite useful when conventional nickel and other less environmentally friendly metals such as lead are used. Thus, the process of the present invention wherein the catalytic system comprises a combination of metal acetyl acetonate and acetyl acetone (as an inhibitor) and wherein the acetyl acetone is driven off with rising temperature to permit a final, complete cure late in the processing cycle is useful and applies to any metal acetyl acetonate including nickel.

In the case of nickel acetyl acetonate, it has been determined that the hydrated forms provide delayed catalytic activity until the water is driven off at which time the final, complete cure takes place. In this case, the water acts as the catalytic inhibitor. Because of this phenomenon, it has been understood that anhydrous nickel acetyl acetonate was not a useful catalyst because it would lead to premature cure. However, in accordance with the present invention, dry or anhydrous forms of nickel acetyl acetone can be successfully utilized where the acetyl acetonate is used as a catalytic inhibitor. This is evidenced with reference to FIG. 4 which shows (1) the increased catalytic activity of anhydrous NAA and (2) the desirably inhibited catalytic activity of the anhydrous NAA by the addition of the acetyl acetone.

As discussed above, water acts as an inhibitor to the NAA catalyst and therefore acetyl acetone has no inhibiting effect on hydrous forms of NAA. However, with reference to FIG. 5, it has been shown that iron acetyl acetonate does not exhibit this catalytic inhibiting phenomenon when in a hydrated environment. That is, iron acetyl acetonate does not exhibit a hydrated form as does NAA. Instead, the acetyl acetone is needed for inhibiting the iron acetyl acetonate whether or not water is present. This is also true for the copper acetyl acetonate. As a general observation therefore, the process of the present invention is useful only on the anhydrous form of the metal acetyl acetonate in those metal acetyl acetonates which exhibit a hydrated form such as nickel acetyl acetone.

Figure 4:
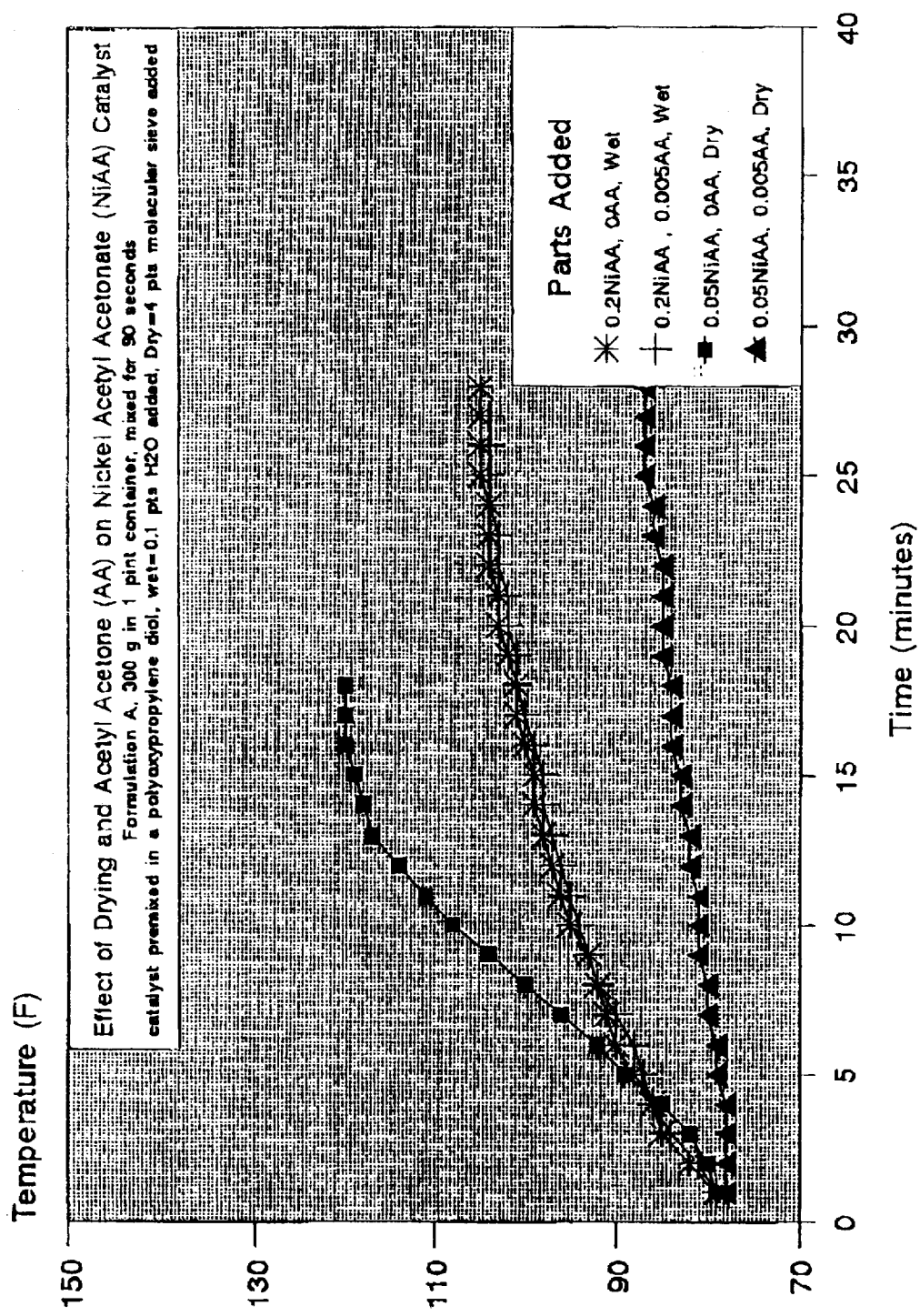
FIG. 4 is a graph of temperature rise vs. time for a reacting urethane mixture for hydrated and anhydrous forms of nickel acetyl acetonate.
Figure 5:
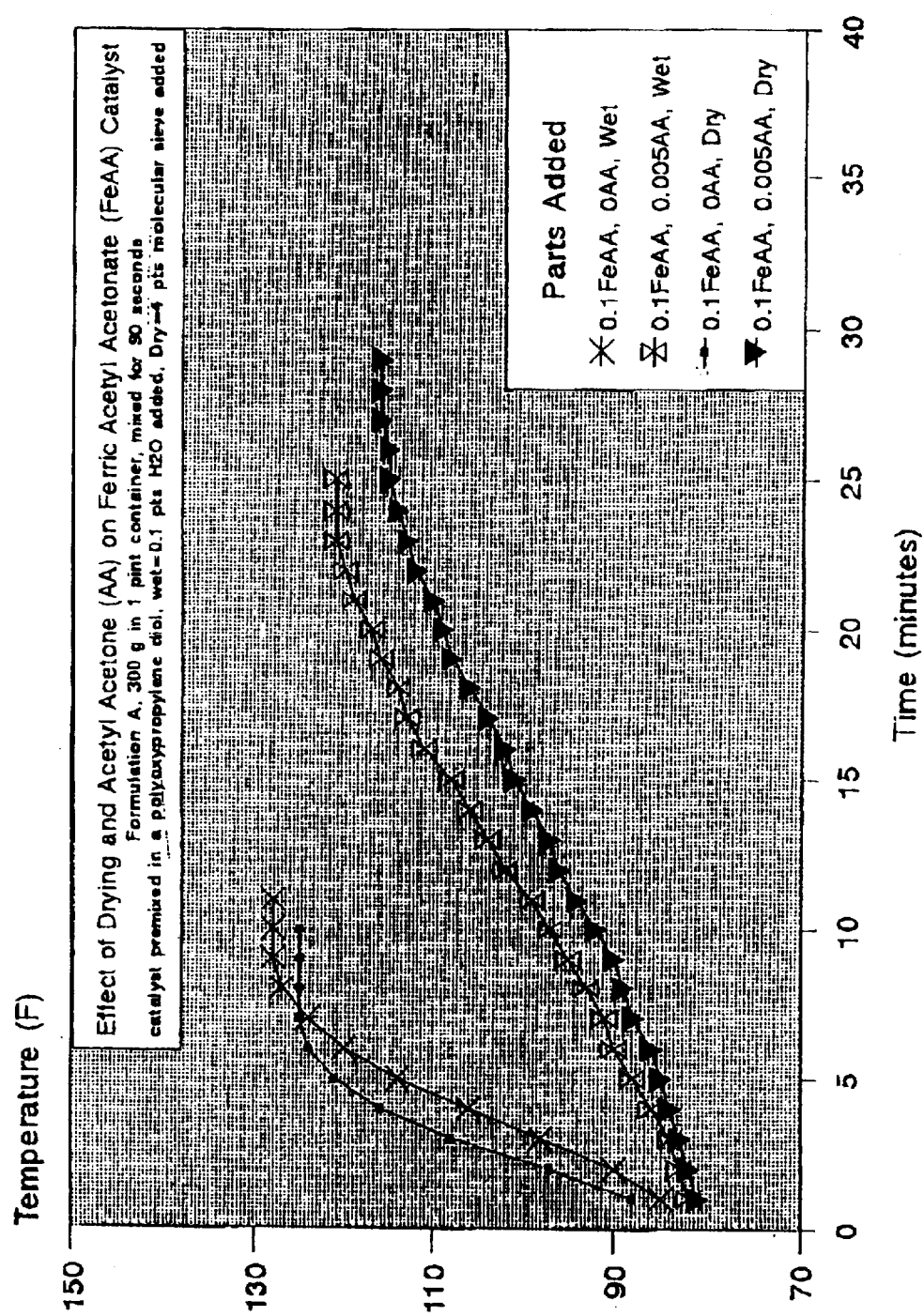
FIG. 5 is a graph of temperature rise vs. time for a reacting urethane mixture of ferric acetyl acetonate and acetyl acetone in an aqueous and non-aqueous environment.

It will be appreciated that in the examples of FIGS. 4 and 5, molecular sieve is added to provide a dry catalyst system.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A process for making polyurethane comprising the steps of:
   forming a reactive urethane mixture which includes a catalyst system, said catalyst system comprising at least one metal acetyl acetonate and acetyl acetone;
   heating said mixture and said catalyst system to a temperature wherein said acetyl acetone is substantially driven off and said metal acetyl acetonate accelerates the cure of said reactive urethane mixture to form polyurethane.

2. The process of claim 1 wherein:
   said urethane prepolymer mixture comprises a foam.

3. The process of claim 2 wherein:
   said urethane prepolymer mixture comprises a mechanically frothed foam.

4. The process of claim 1 wherein:
   the metal of the metal acetyl acetonate is selected from the group consisting of aluminum, barium, cadmium, calcium, cerium (III), chromium (III), cobalt (II), cobalt (III), copper (II), indium, iron (III), lanthanum, lead (II), manganese (II), manganese (III), neodymium, nickel (II), palladium (II), potassium, samarium, sodium, terbium, titanium, vanadium, yttrium, zinc and zirconium.

5. The process of claim 1 wherein:
   the ratio of metal acetyl acetonate to acetyl acetone is about 2.1 on a weight basis.

6. The polyurethane formed by the process of claim 1.

7. The polyurethane formed by the process of claim 2.

8. The polyurethane formed by the process of claim 3.

9. In a process for continuously making polyurethane from a reactive urethane mixture, the improvement comprising the steps of:

adding to the mixture at least one metal acetyl acetonate catalyst;

inhibiting the activity of said catalyst by the addition of acetyl acetone to the mixture;

heating the mixture to substantially drive off the acetyl acetone wherein the activity of said catalyst is increased and said reactive urethane mixture is cured to form a polyurethane.

10. The process of claim 9 wherein:

said urethane prepolymer mixture comprises a foam.

11. The process of claim 10 wherein:

said urethane prepolymer mixture comprises a mechanically frothed foam.

12. In a process for continuously making polyurethane from a reactive urethane mixture, the improvement comprising the steps of:

adding to the mixture at least one anhydrous nickel acetyl acetonate catalyst;

inhibiting the activity of said catalyst by the addition of acetyl acetone to the mixture;

heating the mixture to substantially dive off the acetyl acetone wherein the activity of said catalyst is increased and said reactive urethane mixture is cured to form a polyurethane.

* * * * *

UNITED STATES PATENT AND TRADEMARK OFFICE
CERTIFICATE OF CORRECTION

PATENT NO. : 5,733,945
DATED : March 31, 1998
INVENTOR(S) : Scott S. Simpson

It is certified that error appears in the above-identified patent and that said Letters Patent is hereby corrected as shown below:

Column 1, line 67, delete "dibensonihilediacetylacetonato" and insert therefor --dibenzonitrilediacetonato--.
Column 4, line 50, delete "deuce" and insert therefor --device--.
Column 7, line 44, delete "ferrous" and insert therefor --ferric--.
Column 8, line 29, delete "our" and insert therfor --out--.
Column 9, line 12, delete "base" and insert therefor --based--.
Column 9, line 49, delete "ware" and insert therefor --warm--.
Column 10, line 52, delete "prepolymer".
Column 10, line 54, delete "prepolymer".
Column 10, line 60, delete "iron (III)" and insert therefor --iron (II)--.
Column 10, line 67, delete "2.1" and insert therefor --2:1--.
Column 11, line 16, delete "prepolymer".
Column 12, line 12, delete "dive: and insert therefor --drive --

Signed and Sealed this

Second Day of May, 2000

Attest:

Q. TODD DICKINSON

*Attesting Officer*     *Director of Patents and Trademarks*